(12) United States Patent
Neece (10) Patent No.: US 8,275,096 B2
(45) Date of Patent: Sep. 25, 2012

(54) SYSTEM AND METHOD FOR SECURITY MONITORING AND RESPONSE DELIVERY

(76) Inventor: Roger Neil Neece, Reston, VA (US)

( * ) Notice: Subject to any disclaimer, the term of this patent is extended or adjusted under 35 U.S.C. 154(b) by 1518 days.

(21) Appl. No.: 11/806,205

(22) Filed: May 30, 2007

(65) Prior Publication Data

US 2007/0280462 A1    Dec. 6, 2007

Related U.S. Application Data

(60) Provisional application No. 60/809,295, filed on May 30, 2006.

(51) Int. Cl.
*H04M 11/04* (2006.01)
(52) U.S. Cl. ............. 379/38; 379/39; 340/541; 709/224
(58) Field of Classification Search ............... 379/37–51
See application file for complete search history.

(56) References Cited

U.S. PATENT DOCUMENTS

2002/0067272 A1* 6/2002 Lemelson et al. ......... 340/573.4
2002/0076003 A1* 6/2002 Zellner et al. .................. 379/49

* cited by examiner

*Primary Examiner* — Walter F Briney, III
*Assistant Examiner* — Ibraham Sharifzada
(74) *Attorney, Agent, or Firm* — Ashley J. Wells (57) ABSTRACT

A system and method of security monitoring and response delivery for a user having a user's device by a monitoring service whose services include monitoring the user upon request. The method includes maintaining a user profile for each user in a user database, maintaining response provider information in a response provider database in which response providers are predetermined and include providers of at least one of assistance and emergency services which are selected from among public, private, commercial and non-commercial providers; receiving a transmission of a request for monitoring from a user sent via the user's device over the communication system; and commencing monitoring of the user via the user's device using advanced decision making and analysis tools employing higher logic.

21 Claims, 3 Drawing Sheets

FIG. 3

SYSTEM AND METHOD FOR SECURITY MONITORING AND RESPONSE DELIVERY

CROSS-REFERENCE TO RELATED APPLICATION

This Application claims the benefit of the priority of Provisional Application No. 60/809,295 filed May 30, 2006, the disclosure of which is herein incorporated by reference.

BACKGROUND OF THE INVENTION (1) Field of the Invention

The present invention relates generally to security monitoring and response delivery, and, more particularly, to monitoring a user at their request and transmitting information or an alert to the user and/or a request for appropriate assistance or emergency services to service providers.

(2) Description of the Related Art

Recent methodologies for providing monitoring and response such as requesting emergency services and other assistance include, for example, commercial monitoring services that require operation from a fixed location, such as a residence or business location, and require that the customer initiate a request for service or assistance. Other services operate on a mobile basis, such as roadside assistance provided by automobile clubs, emergency services operated by local governments, commercial providers and the like, but these also require that the customer initiate a service request.

Requests for response, services or assistance may be made verbally, for example, by making a 911 telephone call and orally describing the nature of the service or assistance requested, the situation or events that led to the need, and the precise geospatial location, e.g., the street address, where the services or assistance is needed. Requests for services or assistance alternately may be made physically, for example, by the customer pressing a panic button or making certain keystrokes on a mobile wireless communication device to a monitoring center, such as described in U.S. Pat. No. 6,678,514 to Jill Christine Wheeler titled "Mobile Personal Security Monitoring Service". Such initiation by the customer or other interaction with the customer may be limited in some situations and impossible in other more extreme situations.

Techniques for automatically requesting monitoring and response, such as personal assistance and rendering emergency services, have been developed which use, for example, a sensor to generate a signal which is transmitted as a request for assistance and emergency service without requiring initiation by the user. For example, vehicle monitoring services are available that will transmit a request for assistance to a monitoring center when a sensor detects that the airbags on the vehicle have deployed. In homes or places of business, other monitoring systems are available which trigger the transmission of a request based on certain signals from a user device installed at a fixed location when one or more sensors attached to the user device are triggered. Such systems are based on simple decision logic because the decision logic applied to trigger the request is a single binary, i.e., yes/no, logic. As used herein, "binary logic" is intended to mean "yes"/"no" logic and "single" is intended to mean one application of binary logic. Thus, as used herein, "single binary logic decisions" in monitoring systems means the application of one yes or no decision to the operation of the monitoring and response delivery system. If yes, then the monitoring system operates and monitoring occurs, if no, then monitoring does not occur. In the automobile example cited above, a single yes/no decision is used to trigger the operation of the monitoring system, based on whether the airbags have deployed, yes, or the airbags have not deployed, no. In homes or places of business, other single binary logic systems are available which would decide whether or not to transmit a request for monitoring or assistance based on the receipt of a signal from a user device installed at a fixed location when one or more sensors, such as a physical orientation sensor or a blood pressure sensor attached to the user device, or sensors that detect door openings or motion are triggered In these systems, if the sensor dos not trigger, a no decision is made, and no request is made, and the existence of a trigger from the sensor, is a yes and means a request will be made, This request will be made on the basis of this single yes/no decision; without the requirement for additional analysis, logic or intelligence to be brought to bear in producing an appropriate request, and transmitting it to the appropriate assistance or emergency service provider.

Certain state of the art home and business monitoring systems apply a dual binary logic to the operation of the monitoring system itself. As used herein, "dual" is intended to mean two serial applications of binary logic. Thus, a "dual binary logic decision system" means the application of two "yes" or "no" decisions to the operation of the monitoring and response delivery system. If a "yes" occurs in the first decision, and a "yes" occurs in the second decision, then the monitoring system is set into action and monitoring or response occurs. If a "yes" occurs in the first decision, and a "no" occurs in the second decision, then monitoring or response does not occur. If a "no" occurs in the first decision, then monitoring or response does not occur.

In a dual binary decision logic monitoring system, certain signals and data, such as from a camera, are transmitted only when the signal changes from its base state which is the first application of binary logic, during a certain time period, which is the second application. For example, such a system would transmit camera images only when any image was detected that was different from the base image, the first yes decision and only when the time was in a certain range, the second yes decision. In this manner, a monitoring system that contains a camera aimed at the parking lot entrance to a business could be set to transmit images from the camera only when the camera image of the entrance contained images other than that of the bare entrance and the business was not in operation.

Other systems can apply single and dual binary logic to the capture and recording of monitoring results, such as current state of the art systems where wireless and Internet Web service providers are using the Internet to currently provide monitoring services that will, with the concurrence of the monitored user, employ a single binary decision logic to provide on the Internet to authorized persons a listing of the previous and current locations of the monitored user's wireless device. Under dual binary logic, these locations will only be captured and recorded if the device has been in certain locations or is present in certain locations, i.e., the first yes decision, and has been or is present at certain locations at a pre-determined time schedule, i.e., the second yes decision.

Thus, a technique for operating and providing monitoring services, and producing and transmitting information and alerts to the user and requests for response delivery to potential service providers that will apply advanced logic and decision making techniques that employ decision making logic higher than dual binary logic, is needed to augment and substitute for human processing and it is an object of the present invention to provide the same.

Additionally, it is well known that public health and safety emergency services, even after receiving a request for services and interacting with the requester physically or orally in an appropriate manner, may have issues with the timely and geographically accurate provision of services, or with accurately providing appropriate services based on the interpretation of the situation and condition of the requester. Thus, a technique for requesting emergency assistance is needed that will provide all public and private assistance and emergency service providers with a record of the situation and events involving the requester prior to and including the events that triggered the request that can be analyzed in order to determine the appropriate course of action, and it is a further object of the present invention to provide the same. Such a record would be useful to the user, the requestor and/or their representatives in an investigation of the situation or the response to the situation that resulted in the transmission of a request. Similarly, such a record can also be used to enhance the effectiveness of future investigations into the situation, including identification, and criminal and civil prosecution of those involved in the situation, as well as providing evidence for such investigation and prosecution.

The public record is replete with examples of situations where the transmission and receipt of a request for public health and safety services, and the delivery of such services to the requestor are problematic. For example, the public system may not have on hand the resources to receive all of the requests transmitted, as happened recently in a Massachusetts blizzard where the E911 system did not receive or respond to thousands of mobile emergency calls due to in-bound capacity issues. Issues may exist with the dispatch of assistance or services to the requestor due to budgetary constraints on the number of service providers or responders, or the existence of prior requests for service in the same locality or other areas. Thus, a technique for delivering assistance and emergency services that is not solely reliant on the public health and safety response system is needed and it is yet another object of the present invention to provide the same. Such a technique would allow volunteers, i.e., Good Samaritans, as well as private, commercial entities engaged in the provision of assistance and emergency services to attempt to assist the requestor in a timely and appropriate manner

SUMMARY OF THE INVENTION

These and other objects of the invention are accomplished by providing a method of security monitoring and response delivery for a user having a user's device which at least transmits and may additionally receive information, by a monitoring service whose services include monitoring the user upon request, using a communication system accessible by the user's device and the monitoring system. The method comprises the steps of: (a) maintaining a user profile for each user in a user database that is not resident on the user's device; (b) maintaining response provider information in a response provider database in which response providers are predetermined and include providers of at least one of assistance and emergency services which are selected from among public, private, commercial and non-commercial providers; (c) receiving a transmission of a request for monitoring from a user sent via the user's device over the communication system; and (d) commencing monitoring of the user via the user's device. The step of commencing monitoring of the user via the user's device includes capturing at least one of data transmitted and signals generated by the user's device to provide captured data and signals, using advanced decision science techniques that utilize logic higher than dual binary logic to make decisions concerning best methods to employ to analyze the captured data and signals, analyzing the captured data and signals employing advanced analysis techniques that utilize more than dual binary logic to provide captured data and signals analysis results, making decisions concerning best methods to use to monitor the user selected from among at least one of human and automated monitoring methods employing advanced decision science techniques that utilize logic higher than dual binary logic, and storing in a records database at least one of (A) the data transmitted and signals generated by the user's device and (B) the captured data and signals analysis results.

The method advantageously further comprises the steps of: (e) transmitting over the communication system at least one of (i.) at least one of information and an alert to the user's device and (ii.) a request for services to at least one response provider selected based on advanced decision science techniques and the captured data and signal analysis results, with or without receiving one of a trigger, a response, and an action physically initiated by the user; (f) continuing monitoring of the user via the user's device and monitoring of the at least one response provider via a response provider's device over said communication system to receive from the at least one response provider at least one of an acknowledgement of the request for services, a confirmation of a dispatch of personnel to the user, and a confirmation of delivery of services to the user; (g) interactively facilitating satisfaction of the request for services including sharing information; and (h) recording in the records database at least one of (i.) satisfaction status of the request for services and (ii.) data transmitted and signals generated by at least one of the user's device and the at least one provider's device.

These and other objects of the invention are additionally accomplished by providing a system for security monitoring and response delivery for a user having a user's device which at least transmits and may additionally receive information, by a monitoring and response service whose services include monitoring the user upon request, using a communication system accessible by the user's device and the monitoring system. The system comprises (a) a user database that is not resident on the user's device for maintaining a user profile for each user; (b) a response provider database for maintaining response provider information in which response providers are predetermined and include providers of at least one of assistance and emergency services which are selected from among public, private, commercial and non-commercial pro bono volunteer response providers; (c) means for transmitting a request for monitoring from a user over the communication system to the monitoring and response service which is the user's device; and (d) means for monitoring of the user via the user's device commenced by the monitoring and response service in response to the request for monitoring. The monitoring and response service includes (i.) capturing at least one of data transmitted and signals generated by the user's device to provide captured data and signals, (ii.) using advanced decision science techniques that utilize logic higher than dual binary logic to make decisions concerning best methods to employ to analyze the captured data and signals, (iii.) analyzing the captured data and signals employing advanced analysis techniques that utilize logic higher than dual binary logic to provide captured data and signals analysis results, (iv.) making decisions concerning best methods to use to monitor the user selected from among at least one of human and automated monitoring methods employing advanced decision science techniques that utilize logic higher than dual binary logic, and (v.) storing in a records database at least one of (A) the data transmitted and signals generated by the user's device and (B) the captured data and signals analysis results.

Furthermore, in a preferred embodiment of the monitoring and response system, the means for monitoring and responding is a monitoring and response service which is at least one of a commercial service and a non-commercial service, which is structured as a geographically distributed network of monitoring and response service providers that includes human monitors and responders operating individually or in small groups from locations including at least one of the monitoring and response service providers' homes, vehicles, or other locations, which locations are not provided by the monitoring and response service, and being remotely supervised, and which is available over the communication system and includes the user's device. The means for monitoring and response is not structured at a central station or location or at a number of commercial locations where monitoring and response services are dispatched or occur and are locally physically supervised.

The system advantageously further comprises (e) means for transmitting by the monitoring and response service at least one of (i.) at least one of information and an alert to the user's device and (ii.) a request for response to at least one response provider selected based on advanced decision science techniques and the captured data and signal analysis results, with or without receiving one of a trigger, a response, and an action physically initiated by the user; (f) means for continued monitoring of the user via the user's device and monitoring of the at least one response provider via a response provider's device over the communication system to receive from the at least one response provider at least one of an acknowledgement of the request for services, a confirmation of a dispatch of personnel to the user, and a confirmation of delivery of services to the user; (g) means for interactively facilitating satisfaction of the request for services including sharing information; and (h) a records database for recording at least one of (i.) satisfaction status of the request for services and (ii.) data transmitted and signals generated by at least one of the user's device and the at least one provider's device.

These and other objects of the invention are additionally provided by a method of pro bono security monitoring and response delivery for a pro bono user having a user's device which at least transmits and may additionally receive information, by a monitoring service whose services include monitoring the user upon request, using a communication system accessible by the user's device and the monitoring system. The method comprises the steps of: (a) maintaining a user profile for each pro bono user in a pro bono user database that is not resident on the user's device; (b) maintaining response provider information in a response provider database in which response providers are predetermined and include providers of at least one of assistance and emergency services which are selected from among public providers and private non-commercial volunteer providers; (c) receiving a transmission of a request for monitoring from a pro bono user sent via the user's device over the communication system or pro bono generating such a request for response by the monitoring system itself with or without receiving a request for response from the user; and (d) attempting to commence monitoring utilizing an appropriate volunteer human monitor, and commencing monitoring of the user via the user's device if an appropriate volunteer human monitor is available. The commencing of monitoring includes capturing at least one of data transmitted and signals generated by the user's device to provide captured data and signals, using advanced decision science techniques that utilize logic higher than dual binary logic to make decisions concerning best methods to employ to analyze the captured data and signals, analyzing the captured data and signals employing advanced analysis techniques that utilize more than dual binary logic to provide captured data and signals analysis results, and storing in a records database at least one of (A) the data transmitted and signals generated by the user's device and (B) the captured data and signals analysis results. As in steps (e) through (h) described for methods in the foregoing, the pro bono method proceeds accordingly except that a request for services is a request for response and the service provider will not be paid.

BRIEF DESCRIPTION OF THE SEVERAL VIEWS OF THE DRAWING

The subject invention will hereinafter be described in conjunction with the appended drawing figures, wherein the referenced numerals in the drawing figures correspond to the associated descriptions provided below, and the drawing figures are as follows.

DETAILED DESCRIPTION OF THE INVENTION

Wireless communication devices such as cellular telephones, personal digital assistants (PDA's), global positioning systems (GPS), medical alert devices, and two way communication devices are continuing to proliferate over all geographic and socioeconomic boundaries. Wireless communication service providers are required by law to operate their current systems so that public emergency response services such as E911 are available to customers of their service and the location of such an E911 request be provided to the E911 system from the result of network operations.

Personal devices that provide wireless Internet access are widely available in the United States and globally, and the wireless data networks that enable Internet access are widely available on a local basis from WiFi or other access points maintained by individuals, families and organizations for their local use, access points maintained by commercial organizations such as coffee houses, hotels and airports, or by commercial providers of wireless data services. Globally, in Korea, Singapore and other countries and increasingly in the United States, such data services are provided on a national basis by the same wireless communications network in a seamless manner in conjunction with voice services. Voice communication services over the Internet (VOIP) may be available to these devices.

Personal computers, home control devices, entertainment devices and controllers and other devices that have access to the output of a microphone and input to a speaker, broadband Internet access and are installed at fixed locations are estimated to be resident in over 40% of American businesses and homes. Many commercial entities provide VOIP services for these devices.

Employing these technical advances and applying them to security monitoring and response delivery, the present invention monitors and responds to a user in more sophisticated ways using Internet social networking techniques, combined with decision support techniques, data and/or signal processing technology and management science, operations research, and artificial intelligence, and decision science techniques for analyzing data and/or signals transmitted over wireless communication services, the wired Public Switched Telephone Network (PSTN), cable networks, and the Internet. The monitoring service monitors the user using advanced automated decision making and analysis tools, and produces and transmits information and alerts and/or requests for appropriate response for assistance or emergency services from service providers. Further, the monitoring service shares pertinent information to facilitate the delivery of assistance or emergency services by public and private, commercial and non-commercial service providers to augment the delivery of public health, safety and emergency services. Additionally and when appropriate, the monitoring service records the data and signals during monitoring, as well as its decisions and analysis results, and retains a record of the monitoring session which may be useful during subsequent investigations and for evidentiary purposes.

The monitoring service of the present invention produces and transmits information and alerts to the user, and/or requests for services to service providers without any action on the part of the user other than previously registering for the monitoring service online and subsequently and periodically requesting that monitoring be initiated. The request that monitoring be initiated can be, by way of example but not limitation, by voice or e-mail or by execution of software on the user's device. The user's device can be a common wireless mobile device, a personal computer, or a personal digital assistant.

The present invention provides techniques for operating and providing monitoring and response services, and producing and transmitting alerts and requests for assistance that apply Internet social networking techniques and advanced logic and decision making techniques beyond dual binary logic. The techniques of one embodiment of the present invention utilize management science, operations research, artificial intelligence and decision science tools and techniques to provide a greater level of security and piece of mind to the user. These techniques allow the monitoring service and the user to respond to a greater number of more complex situations, for example, where the monitored users' vehicle has been involved in an emergency incident that did not deploy the airbags, such as a car jacking. In such situations, these techniques, combined with data and signal analysis of the transmission from the user's device can be used to monitor, detect, and signal such activity.

These advanced techniques also afford the user the ability to transmit a request for monitoring, response, assistance or help only to appropriate service providers or contacts, and to additionally give potential public and private service assistance providers the ability to respond or behave in a more appropriate manner based on social networking techniques and an analysis of the monitored signal and data and location information to include an indication of severity and an indication of the urgency of the required response, and pre-supplied user information that would indicate certain aspects of the users' situation, as well as location information.

In accordance with one aspect of the invention, the information and alerts transmitted by the monitoring service to the user over the communication system includes, by way of example but not limitation, information and alerts generated by at least one of (a) federal agencies including Federal Department of Homeland Security, Federal Emergency Management Agency, and National Weather Service (b) state public health and safety and homeland security systems, and (c) and local public health and safety and homeland security systems supplied to the monitoring service by subscription or for free as pre-event or post-event emergency or homeland security alerts, and (d) alerts and information generated by the monitoring service itself from its operation. The latter may include volume of requests for assistance generated by the monitoring system for a particular location.

In accordance with the invention, continuing monitoring of the user via the user's device may further comprise transmitting information and alerts to the user's device based on at least one of captured data and signals analysis results, indication of urgency, severity rating, and pre-event or post-event alerts. These alerts may include emergency or homeland security alerts.

The monitoring service may interactively facilitate satisfaction of the request for services in a variety of ways including, by way of example but not limitation, (1) granting limited access to the at least one provider to databases of the monitoring service including the user database containing the profile of the user, and the location database indicating a geospatial location of the user's device, and (2) providing copies of pertinent data transmitted and signals generated by the user's device, and access to data and signals analysis results determined by the monitoring service. The monitoring and provider services are facilitated by the monitoring service through monitoring of the data transmitted and signals generated by the user and by the at least one private response provider.

The monitoring and response service may be a commercial service or a non-commercial service and may be structured as a geographically distributed network of service providers that includes human monitors and optionally response service providers, utilizing a distributed computing network and information technology services available over the communication system and including the user's device. Notably, the monitoring system may not be structured at a central station or location or at a number of commercial locations where monitoring and response services are dispatched, occur and are locally physically supervised, but in a geographically distributed network of monitoring and/or response providers operating individually or in small groups from their homes, vehicles, or other locations not provided by the monitoring and response service and being remotely supervised.

The request for services transmitted by the monitoring service may be transmitted to commercial providers and/or to non-commercial volunteers. Thus, the request for services may be at least one of (a) a request for services transmitted by the monitoring service to selected commercial service providers based on information in the response provider database and (b) an opportunity for self-initiation of assistance transmitted by the monitoring service to selected non-commercial volunteers providers based on information in the provider database. Selection of providers is based on factors including a non-commercial or commercial provider profile, current location, rate of travel, self-determined availability, current possession of a device that enables monitoring, and existence of selected information in the user's profile.

When the request for services is transmitted as an opportunity for self-initiation of assistance by the monitoring service to at least one selected non-commercial volunteer provider based on information in the provider database, delivery of emergency services or other assistance is self-initiated by the at least one selected non-commercial volunteer. The at least one selected non-commercial volunteer is selected from the group consisting of users, members, subscribers, and persons who maintain an affiliation with a non-commercial response provider. The at least one non-commercial volunteer selected will have established and will currently maintain a profile with the monitoring and response service. Of particular significance in selecting a non-commercial volunteer is the volunteer's proximity to the appropriate local area determined by the monitoring service of the user requesting monitoring at that time when the monitoring service transmits the request for service. The volunteer, moreover, should not be providing services as a member of a public health and safety work force at that time.

The request for response transmitted by the monitoring and response service results in delivery of services including at least one of assistance and emergency services by any service provider selected from among public and private, commercial and non-commercial service providers including volunteers. When the monitoring and response service is a commercial service, the request for services may be transmitted by the monitoring service to a commercial service provider based on information in the response provider database. Then, the request for services results in response and delivery of assistance and emergency services by the commercial service provider facilitated by continued monitoring by the monitoring service. Continued monitoring by the monitoring service facilitates delivery of services, for example, by providing joint access by the user and the provider to at least one of the user's data transmitted and signals generated, data and signals analysis results, indication of urgency, and severity rating.

The communication system utilized may be at least one of a wireless communication network, Internet, cable, and PSTN. The user's device may be selected from among a common wireless communication device, an Internet-enabled PC, and any other device having communication capability over the communication system and having at least one of a microphone and a camera.

The user database may be housed in a storage device which is resident in at least one of the wireless communication network, the Internet at a specific Internet address, and at a service provider selected from among at least one of a monitoring provider and an response provider. By way of example but not limitation, each user profile may include information related to at least one of contact, medical, time, billing, call tracking, and geospatial location.

The request for monitoring from a user sent via the user's device over the communication system may additionally include one of a 911 request, an E911 request, and another public assistance request. That is, the request for monitoring and the additional request may be sent simultaneously or serially.

When monitoring is commenced, the monitoring services advantageously include (a) identifying at least one of the user and the user's device; (b) accessing the user profile for the user identified; (c) initiating and maintaining a record of at least one of the data transmitted and the signals generated by the user's device; (d) maintaining a location database of the locations of the user's device over time; (e) accessing or maintaining an alert database of alerts issued by at least one of federal, state, and local entities regarding at least one of public health and safety, weather and homeland security; (t) maintaining a signature database of pre-determined signatures of human speech, visual, and event signatures whose presence in at least one of the data transmitted and the signals generated by the user's device are subjects for analysis; (g) determining whether or not the pre-determined signatures are present by: (i.) using advanced decision science techniques that utilize more than dual binary logic to make decisions concerning best methods to employ to analyze the captured data and signals and provide captured data and signal analysis results that determine whether or not the pre-determined signatures are present, (ii.) analyzing the captured data and signals employing advanced automated analysis techniques that utilize more than dual binary logic to provide captured data and signal analysis results that determine whether or not the pre-determined signatures are present and perform further analysis and interpretation functions, (h) making decisions concerning best methods to use to monitor the user selected from among at least one of human and automated monitoring methods employing advanced decision science techniques that utilize more than dual binary logic; (i) maintaining a results database of the captured data and signals analysis results; and (j) determining an indication of urgency for a required response by applying operations research and management science analysis and decision science support tools to information including the captured data and signals analysis results, the alerts, the location data, and information from other databases, and calculating a severity rating based on occurrence and number of the pre-determined signatures included in the captured data and signals, and internal measures produced by the monitoring system in the course of the captured data and signals analysis.

The signature database advantageously contains pre-determined signatures unique to the user including signatures established by at least one of biometric analysis of the user, voice recognition of the user, and another signature personal to the user, and event signatures attributed to or correlated with certain physical events including firing of weapons and sirens from public health and safety emergency response vehicles.

Transmitting a request for services to at least one provider may include selecting the at least one provider from the provider database based on data and signal analysis results, indication of urgency, and severity rating; accessing contact information including internet address, telephone number, and facsimile number for respective ones of the at least one provider; and transmitting the request for services to the at least one provider, preferably until successful. Transmitting a request for services to at least one provider may additionally include granting limited access to the at least one provider to databases of the monitoring service including the user database containing the profile of the user, and the location database indicating a geospatial location of the user's device; and providing copies of or joint access to pertinent data transmitted and signals generated by the user's device, and access to data and signal analysis results determined by the monitoring service.

In accordance with one aspect of the current invention, the physical geographic location of the user requesting monitoring or assistance is recorded upon initiation of monitoring and prior to the transmittal of a request for assistance or emergency services, and the transmittal of the request for assistance to a public or private service provider will include access to the record of the user's location.

In accordance with another aspect of the current invention, the production and transmittal of an appropriate alert to a presently monitored user, or request for assistance for a presently monitored user may occur without any further interaction with or effort on the part of the user, thus, eliminating the need for the user to orally communicate or otherwise interact with potential service providers.

In accordance with yet another aspect of the present invention, the user profile of personal information about the user may include user provided data and data about potential monitoring, assistance and emergency service providers. Such information may include the location of any fixed Internet access devices that the user presently has access to and the location of the current wireless access point that the user is using may be maintained on a database that is not resident on the user's device, e.g., wireless communication device, internet enabled PC, or other device described above. Such a database may be resident on or in software residing on the wireless communication network itself, on the Internet, or at a specific Internet address, or in equipment of the monitoring, emergency, and assistance services provider. In this way, information such as contact data, medical information, time information, billing information, call tracking information or geospatial location information may be made available in a timely manner to potential monitors in the monitoring service's network, and public or private assistance or emergency service providers.

In accordance with a further aspect of the present invention, the monitored signal and data produced by or transmitted by the user's device is analyzed and subjected to data and signal processing, some of which may occur in a distributed computing environment which may include the user's device. Such analysis and processing may include examination for the presence of certain pre-identified patterns or "signatures" produced by or correlated with the user's voice and speech, such as cries for "help" or other preset user patterns and events such as the firing of weapons or sirens from the response of public health and safety providers, and the results of such analysis combined with location based data and the application of decision support, management science, artificial intelligence, operations research techniques and decision science analysis of the analyzed data and signal and of data contained in the database to include the user's personal profile and information on potential assistance or service providers to produce an appropriate request for assistance or service. In this way, only potential service providers who are local to the user at the time of the request will be sent a request; and only those providers, contacts of the user, or others authorized by the user who could provide appropriate assistance or service would be transmitted a response request and potentially dispatched according to the results of the analysis.

Monitoring Service Operational Detail

The monitored signal produced by the user's transmitting device is analyzed and subjected to decision support assisted signal processing. In this signal processing, the record of the monitored signal in combination with geospatial data, location data and physical environment data is processed by hardware and software specifically designed for such processing, and the software contains or utilizes certain signal processing techniques and algorithms and artificial intelligence techniques, such as pattern recognition, to determine the patterns that the signal contains. The choice of particular signal processing techniques and algorithms and artificial intelligence techniques to be applied to the signal is assisted by decision support systems which utilize geospatial, location and physical environment data to optimize the results of the signal processing. The patterns that the signal contains are then analyzed to determine if there is a match between the patterns existing in the monitored signal and the patterns, or signatures, of certain pre-identified patterns produced by or correlated with events, such as the firing of a weapon or sirens from the response of public health and safety providers, or a cry of "help" from the user, member, or subscriber or a wide range of other potentially significant events. This matching is carried out using advanced mathematical techniques, such as curve fitting through the use of interpolation, regression analysis, total least squares, and advanced statistical techniques which may include sample structuring and selection based on sampling theory and Bayesian probability analysis, inference and filtering.

The results of such signal analysis is combined with location based data, and techniques of management science, artificial intelligence, operations research and decision science are applied to the analysis of the data in the signal and metadata concerning the analyzed signal, and the data contained in the database to include the user's personal profile and information on potential assistance or service providers to produce an appropriate request for assistance or service. This data on the user and potential service providers is maintained in a form, such as a database, that can include pre-determined data from the current profile to include biometric data, voice profile data, and data that is derived from the tracking and signal analysis, such as the rate and direction of travel of the monitored device.

Management science, artificial intelligence, operations research and decision science techniques are then applied to the database or other form of the data including exogenous data to include alerts or other messages received from the state, local or federal public health and safety, weather or homeland security systems to determine the severity of the situation that has produced the monitored signal or the alert, and to produce particular requests in response to particular levels of severity, alert or other measures of the situation that are calculated by the monitoring system using these techniques. The monitoring system then utilizes techniques, by way of example but not limitation, including decision support techniques, such as decision trees, scenario development and analysis, modeling and simulation, statistical analysis and projection, and optimization methods, such as linear and dynamic programming, to prioritize the transmission of requests to particular potential public and private personal assistance and emergency service providers, as well as to produce and transmit certain signals to the user's device.

In this way, only alerts that are relevant to the user based on location and time data, as well as other factors, would cause the transmission of signals from the monitoring service to the user's device or other authorized users' devices, and only potential service providers who are local to the user at the time of the request would be transmitted the request to provide help or assistance; and only those providers, contacts of the user, or others authorized by the user who could provide appropriate assistance or service would be transmitted a request and potentially dispatched according to the results of the analysis.

For example, certain volunteers, i.e., Good Samaritans, could have previously indicated their willingness and availability to assist users and the monitoring service of the present invention can determine if the volunteer is within the local area of the user having a need for help and assistance. By way of example but not limitation, among these volunteers is a 26 year old male in the Military service who had recently returned from Iraq duty who is further from the location of the user on behalf of whom the request is made but is on a fast moving public transportation conveyance and about to disembark locally, and a 55 year old female with no self defense training who is traveling on foot and also local to the request. The monitoring service could use its advanced techniques to optimize and prioritize the production and transmission of a request for help or assistance by first producing a particular request for assistance directed to the male in military service and then to produce and transmit a different particular request for assistance to the female based on the analysis of the monitored signal and the other data which in this example include a high severity rating based on indications of potential assault on the user, member, or subscriber. Such severe indications would also cause the production and transmission of a request to the public health and safety system, simultaneously with the transmission of a request to the male volunteer. If the indications resulting from the signal analysis and data analysis were different, i.e. with a lesser severity rating or other measures, then the monitoring system might transmit a particular request first to the female, and then only based on certain subsequent measures transmit a particular request to the male volunteer, and not produce and transmit a request to the public health and safety system. In addition, certain indications and measures including certain information in the user's profile would cause the monitoring system to also produce and transmit a request only to personal contacts of the user, and/or certain private commercial personal assistance and emergency service providers, either in conjunction with or in lieu of the production and transmission of a request to volunteers and the public health and safety system.

Figure 1:
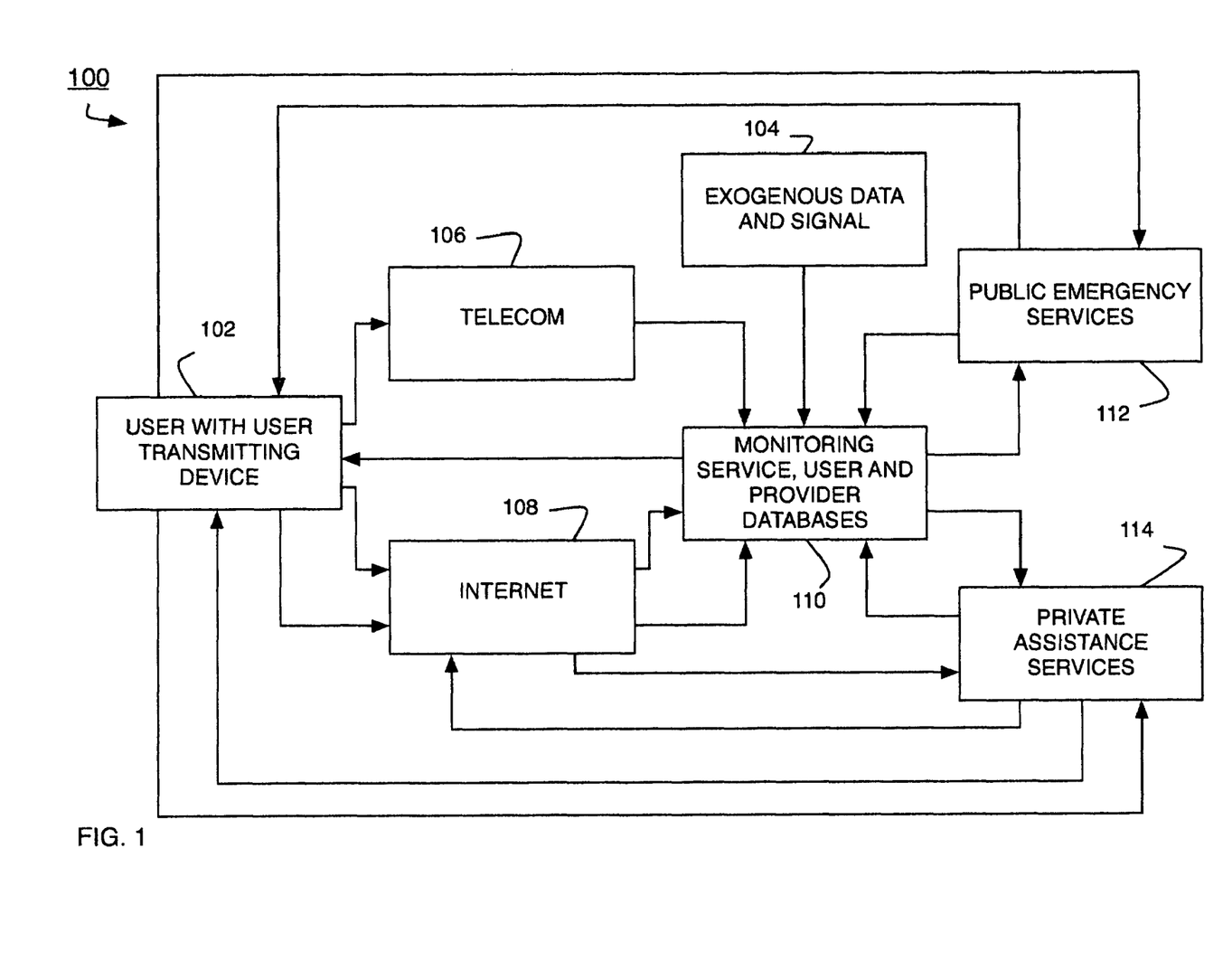
FIG. 1 is a schematic flowchart of a system and method for a user to register and subsequently request monitoring, for the monitoring service to maintain user and provider databases, to commence monitoring when requested by the user, and to transmit information and alerts to the user and requests for assistance and emergency services to service providers in accordance with an embodiment of the present invention.

FIG. 1 is a schematic flowchart of a system and method for a user to register and subsequently request monitoring, for the monitoring service to maintain user and provider databases, to commence monitoring when requested by the user, and to transmit information and alerts to the user and requests for assistance and emergency services to service providers in accordance with an embodiment of the present invention. FIG. 1 illustrates an exemplary monitoring service and response service provider system 100, including a user, 102 carrying a wireless communication or other non-fixed communication device that may have or have access to Global Positioning Satellite (GPS) location information or have internet access, or using a PSTN telephone, or using a personal computer or personal digital assistant that is connected to the Internet from a fixed location or a wireless mobile access, GPS or location data obtained from the user or the E911 system or directories or databases of location information and alert data from various federal, state and local sources, i.e., exogenous data and signals 104, a wireless and PSTN wired telecommunications and Internet communications network system 106, the Internet and associated Internet service provider and required communications network 108, a monitoring service 110, public health and safety emergency service providers 112, and private emergency service and other assistance providers 114.

The user 102 has access to a device that accesses the Internet 108, and registers online with the monitoring service at its web site. The user 102 then, with an appropriate device, establishes communication with the monitoring service 110 over a telecommunications network 106 including a wireless telecommunication network 106 and/or a PSTN 106, or over the Internet 108 by wireless or fixed internet access, and also enables the monitoring service 110 and public and private emergency and assistance providers 112, 114 to access GPS or other location data, i.e., exogenous data 104. The telecommunications 106, i.e., Telco 106, and Internet based communication systems 108 transmit the data and voice signal or a copy of the data and signal originating from the user 102 or the GPS and location data 104 to a monitoring service 110. In this regard, the monitoring service 110 may be the wireless, or PSTN, or the Internet communications service provider 106, or a private commercial or non-commercial entity 114 specializing in providing monitoring services. The monitoring service 110 provides monitoring including location monitoring of the user 102, and human and automated data and signal analysis, and management science analysis and decision support services on the basis of the data and signals analysis (see FIG. 3), the alerts and the user profile. The results of the data and signal analysis, and the management science analysis and decision support performed provide the basis for the production and transmittal of an appropriate request for assistance (see 205 in FIG. 2) on behalf of the user 102 from the monitoring service 110. In any event, the request 205 is transmitted to appropriate public 112 and private 114 response emergency service and assistance providers on the basis of the results of the analysis (see 307 in FIG. 3) of the monitored user 102 data and signal. After the transmittal of the request, the monitoring service 110, begins to monitor (see 206 in FIG. 2) the data and signal of the dispatched private assistance or service provider 114, and may monitor the data and signal of the public emergency service provider 112, and in any case continues to monitor and maintain a record (see 207 in FIG. 2) of the data and signal produced by the user 102 for an appropriate period of time, or until the monitoring service is discontinued by the user 102.

Figure 2:
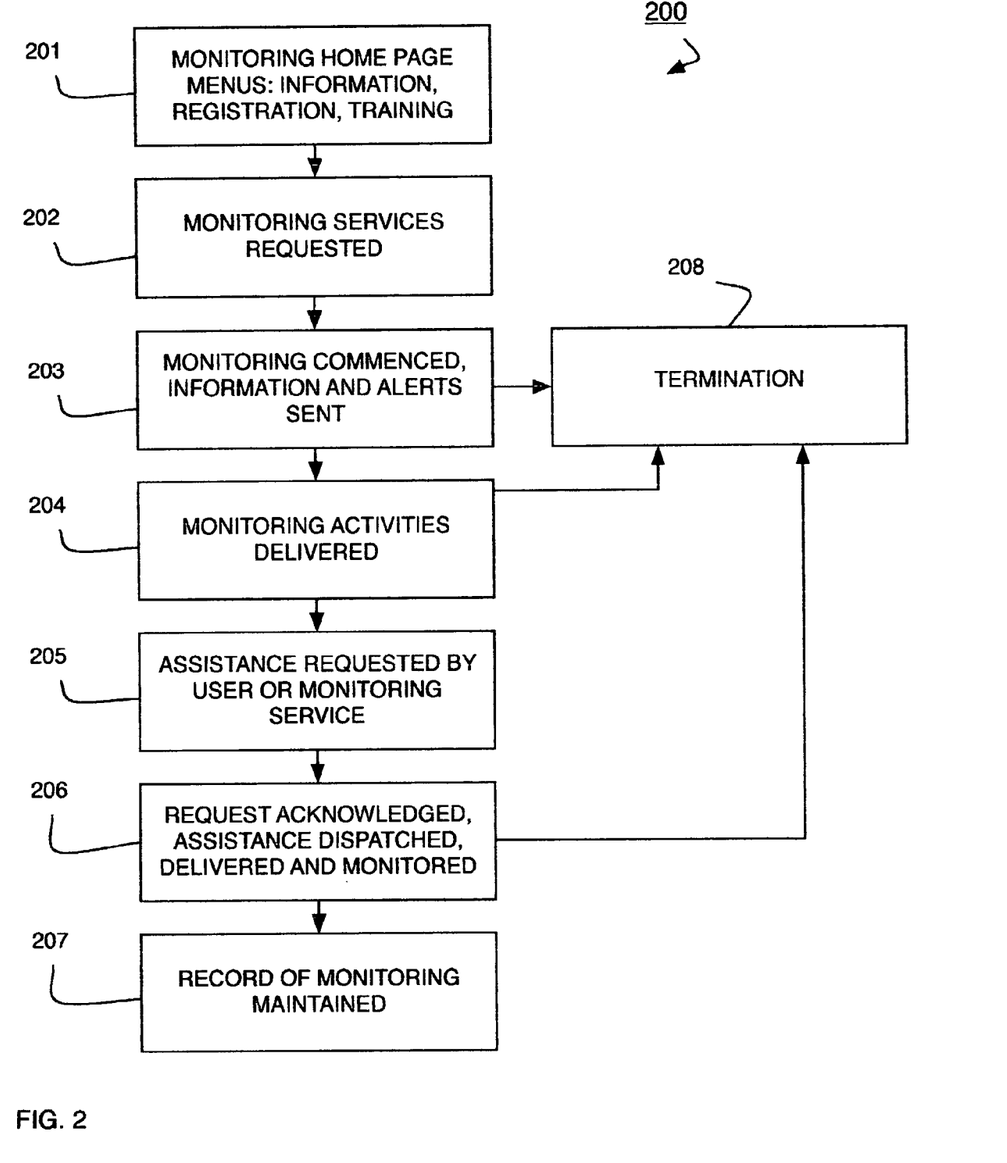
FIG. 2 is a schematic flowchart illustrating exemplary steps involved for a user to register online with the monitoring service and subsequently and periodically request monitoring, for the monitoring service to commence monitoring when requested, send information and alerts to the user, request assistance and emergency services from service providers, continue monitoring, and record keeping, and for service providers to acknowledge the monitoring services request, dispatch assistance, and deliver services in accordance with an embodiment of the present invention.

FIG. 2 is a schematic flowchart illustrating exemplary steps involved for a user to register online with the monitoring service and subsequently and periodically request monitoring, for the monitoring service to commence monitoring when requested, send information and alerts to the user, request response including assistance and emergency services from service providers, continue monitoring, and record keeping, and for service providers to acknowledge the monitoring services request, dispatch assistance, and deliver services in accordance with an embodiment of the present invention. FIG. 2 illustrates high level process flow 200 for accessing 201 and utilizing 202 monitoring services and requesting 205 and receiving assistance 206 from private and public sources 112, 114. The process begins with the user 102 accessing a public web site 201 of the monitoring service 110, and completing the registration and certification process which provides the user, who is then a registered user, with a means of accessing the monitoring service 110. When the user 102 requests monitoring services 202 by initiating a request for monitoring, the monitoring service 110 responds by commencing monitoring 203 including sending pertinent information and alerts 204. The user 102 my elect to terminate monitoring 208 after receiving the information and alerts 204, or may permit continued monitoring if the user 102 considers that monitoring is advisable. The user 102 may terminate monitoring 208 when monitoring is considered to be no longer advisable. When appropriate, the monitoring service 110 requests assistance 205 from public response providers 112 and/or private assistance providers 114. The monitoring service's request 205 is acknowledged 206 and the providers 112, 114 respond, dispatch personnel and deliver assistance to the user 102. The monitoring service 110 continues to monitor 206 the user 102 and the private response providers 114 and may monitor public provider 112. The monitoring service 110 maintains a record of the monitoring 207.

Figure 3:
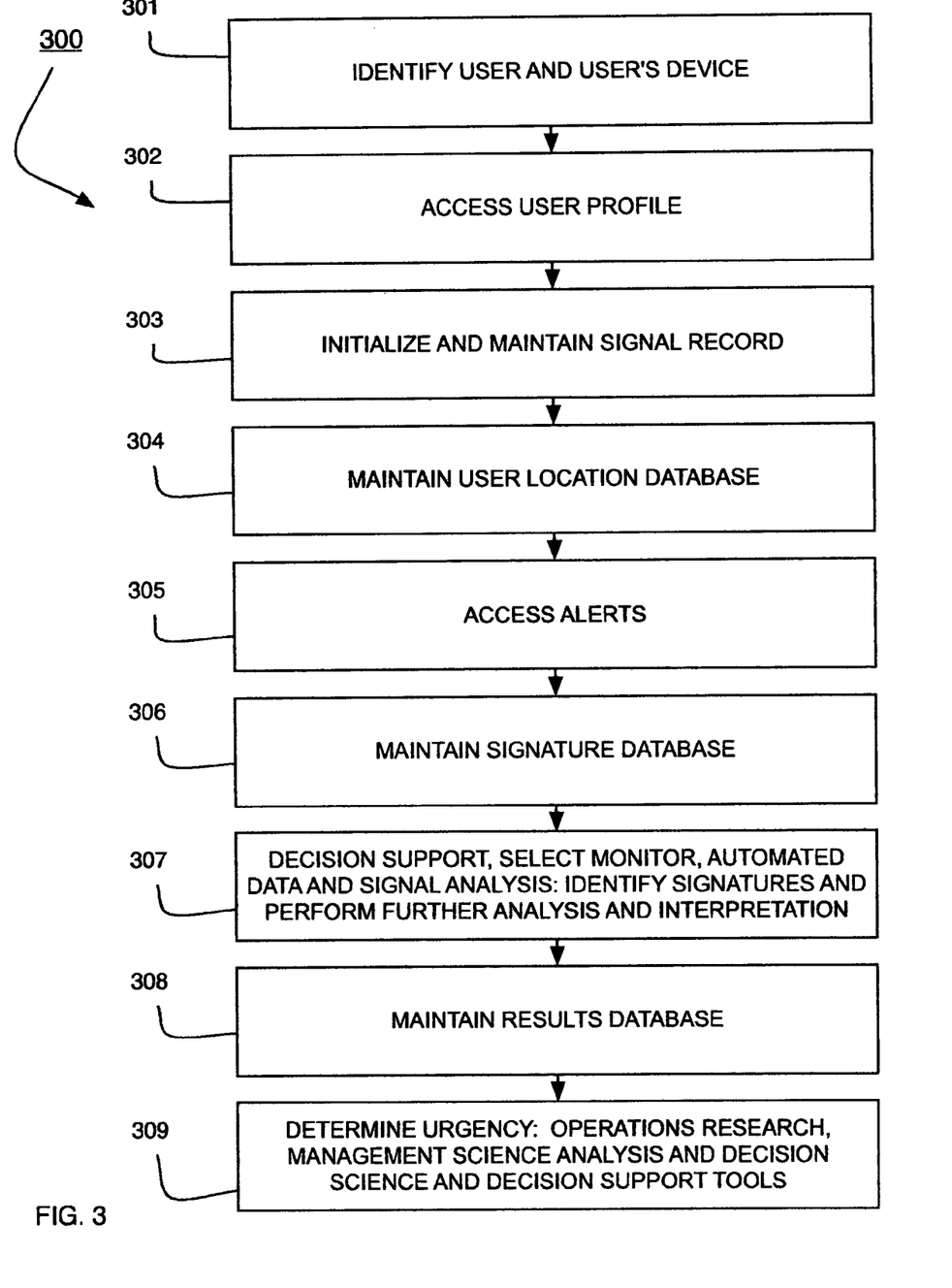
FIG. 3 is a schematic flowchart illustrating details of exemplary steps taken by the monitoring system to commence monitoring in response to a registered user's request for monitoring, the steps including decision making and analysis using logic higher than dual binary logic in accordance with an embodiment of the present invention.

FIG. 3 is a schematic flowchart illustrating details of exemplary steps taken by the monitoring system to commence monitoring in response to a registered user's request for monitoring, the steps including decision making and analysis using logic higher than dual binary logic in accordance with an embodiment of the present invention. FIG. 3 illustrates steps included in commencing monitoring 300. The monitoring system 110 responds to a request for monitoring 202 from a user 102 by identifying the user 301 and the user's device 301, and accessing the user's profile 302. Then, a data and signal record is initialized and maintained 303, and a user location database is maintained 304. Alerts are accessed 305 and a signature database is maintained 306. The monitoring service 110 then performs decision support 307 to select and apply a monitor to the user and performs automated data and signal analysis including identifying signatures and performing further analysis and interpretation. A results database is maintained 308. A determination of urgency 309 is performed using operations research, management science analysis and decision science and decision support tools.

The monitoring services are initiated by request 202 from the user 102, or automatically if the user 102 initiates a 911 or E911 call. Upon receipt of the request for monitoring 203, a copy or record 303 of the user data and signals, including any E911 or other calls, and location information 304 is transmitted to or accessed by the monitoring service 110. Alerts 305 for Public Health and Safety and Homeland Security that are public are also accessed, i.e., received by monitoring service 110. The monitoring service 110 then analyzes the user's situation 307 by performing data and signal analysis, and applies decision support, artificial intelligence, and operations research, management science and decision science analysis to the data and the signal generated by or transmitted from the user 102. This may include selecting or applying a monitor 310 (not shown) for the user 102 and initiating communication with the user 102 including the communication of relevant alerts 305. If the decision-supported analysis results 307 of the user's 102 situation indicate that an event or situation or alert is occurring or has transpired that would require an alert to the user 203 or provision of assistance 205, then the monitoring service 110, using the selected or applied monitor 310 (not shown), produces and transmits an alert 203 or request for assistance 206. This request 206 includes certain user profile information, situation and location information or a method for accessing such information, and is then received and evaluated by the public 112 or private 114 service provider, and these providers 112, 114 provide or attempt to provide assistance. Whether or not appropriate services are dispatched or delivered 206, the monitoring service 110 will continue to monitor the data and signal of the user 102, and any private assistance providers 114 dispatched by the monitoring service 110. Additionally, a record 207 of the monitored data and signals, request 205 and monitored assistance 206 is maintained by the monitoring service 110.

Although the present invention has been described with reference to the drawing figures, those skilled in the art will appreciate that the scope of the invention is not limited to the specific forms shown in the figures. Various modifications, substitutions and enhancements may be made to the descriptions set forth herein, without departing from the spirit and scope of the invention which is set forth in the appended claims.

While the present invention has been described in conjunction with embodiments and variations thereof, one of ordinary skill after reviewing the foregoing specification will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A method of security monitoring and response delivery for a user having a user's device which at least transmits and may additionally receive information, by a monitoring service whose services include monitoring the user upon request, using a communication system accessible by the user's device and the monitoring system, the method comprising the steps of:
   a. maintaining a user profile for each user in a user database that is not resident on the user's device;
   b. maintaining response provider information in a response provider database in which response providers are predetermined and include providers of at least one of assistance and emergency services which are selected from among public, private, commercial and non-commercial providers;
   c. receiving a transmission of a request for monitoring from a user sent via the user's device over the communication system;
   d. commencing monitoring of the user via the user's device including:
      i. capturing at least one of data transmitted and signals generated by the user's device to provide at least one of captured data and signals;
      ii. using advanced decision science techniques that utilize logic higher than dual binary logic to make decisions concerning best methods to employ to analyze the captured data and signals;
      iii. analyzing the captured data and signals employing advanced analysis techniques that utilize more than dual binary logic to provide captured data and signals analysis results;
      iv. making decisions concerning best methods to use to monitor the user selected from among at least one of human and automated monitoring methods employing advanced decision science techniques that utilize logic higher than dual binary logic; and
      v. storing in a records database at least one of (a) the data transmitted and signals generated by the user's device and (b) the captured data and signals analysis results;
   e. transmitting over the communication system at least one of (i) at least one of information and an alert to the user's device and (ii) a request for services to at least one response provider selected based on advanced decision science techniques and the captured data and signal analysis results, with or without receiving one of a trigger, a response, and an action physically initiated by the user;
   f. continuing monitoring of the user via the user's device and monitoring of the at least one response provider via a response provider's device over said communication system to receive from the at least one response provider at least one of an acknowledgement of the request for services, a confirmation of a dispatch of personnel to the user, and a confirmation of delivery of services to the user;
   g. interactively facilitating satisfaction of the request for services including sharing information; and
   h. recording in the records database at least one of satisfaction status of the request for services and data transmitted and signals generated by at least one of the user's device and the at least one provider's device.

2. The method according to claim 1, wherein transmitting over the communication system in step (e) transmits at least one of information and an alert to the user's device.

3. The method according to claim 1, wherein transmitting over said communication system at least one of information and an alert to the user's device in step (e)(i) comprises information and alerts generated by at least one of (a) federal agencies including Federal Department of Homeland Security, Federal Emergency Management Agency, and National Weather Service (b) state public health and safety and homeland security systems, and (c) and local public health and safety and homeland security systems supplied to the monitoring service by subscription or for free as pre-event or post-event emergency or homeland security alerts, and (d) alerts and information generated by the monitoring service from its operation.

4. The method according to claim 1, wherein continuing monitoring of the user via the user's device in step (f) further comprises transmitting information and alerts to the user's device based on at least one of captured data and signals analysis results, indication of urgency, severity rating, and pre-event or post-event alerts.

5. The method according to claim 1, wherein interactively facilitating satisfaction of the request for services in step (g) further comprises i. granting limited access to the at least one provider to databases of the monitoring service including the user database containing the profile of the user, and the location database indicating a geospatial location of the user's device, and ii. providing joint access to or copies of pertinent data transmitted and signals generated by the user's device, and access to data and signals analysis results determined by the monitoring service.

6. The method according to claim 1, wherein the monitoring service is at least one of a commercial service and a non-commercial service, wherein the monitoring and response service is structured as a geographically distributed network of monitoring and response service providers that includes human service providers, available over the communication system and including the user's device, and is not structured at a central station or location or at a number of commercial locations where monitoring and response services occur and are physically supervised, and wherein monitoring and provider services are facilitated by the monitoring service through monitoring of the data transmitted and signals generated by at least one of the user and the at least one response provider.

7. The method according to claim 1, wherein the request for services is transmitted as at least one of (a) a request for services transmitted by the monitoring service to selected commercial service providers based on information in the response provider database and (b) an opportunity for self-initiation of assistance is transmitted by the monitoring service to selected non-commercial volunteers providers based on information in the provider database, and wherein selection is based on factors including a non-commercial or commercial provider profile, current location, rate of travel, self-determined availability, current possession of a device that enables monitoring, and existence of selected information in the user's profile.

8. The method according to claim 7, wherein the request for services is transmitted as an opportunity for self-initiation of assistance by the monitoring service to at least one selected non-commercial volunteer provider based on information in the provider database, wherein delivery of emergency services or other assistance is self-initiated by the at least one selected non-commercial volunteer, wherein the at least one selected non-commercial volunteer is selected from the group consisting of users, members, subscribers, and persons who maintain an affiliation with a private, commercial or non-commercial emergency and other assistance provider, wherein the at least one selected non-commercial volunteer has established and currently maintains a profile with the monitoring service, and wherein the at least one selected non-commercial volunteer is within the appropriate local area determined by the monitoring service of the user requesting monitoring at that time when the monitoring service transmits the request for service and is not providing services as a member of a public health and safety work force at that time.

9. The method according to claim 1, wherein the monitoring service is a commercial service, wherein the request for services is transmitted by the monitoring service to a commercial service provider based on information in the provider database, and wherein the request for services results in delivery of assistance and emergency services by the commercial service provider, and is facilitated by continued monitoring by the monitoring service.

10. The method according to claim 1, wherein the request for services transmitted by the monitoring service results in delivery of services including at least one of assistance and emergency services by any service provider selected from among public and private, commercial and non-commercial service providers including volunteers, and is facilitated by continuing monitoring by the monitoring service which provides joint access to at least one of the user's data transmitted and signals generated, data and signals analysis results, indication of urgency, and severity rating.

11. The method according to claim 1, wherein the communication system comprises at least one of a wireless communication network, Internet, cable, and PSTN, and wherein the user's device is selected from among a common wireless communication device, an Internet-enabled PC, and any other device having communication capability over said communication system and having at least one of a microphone and a camera.

12. The method according to claim 11, wherein the user database is housed in a storage device which is resident in at least one of the wireless communication network, the wireless Internet, the PSTN, cable or other wired Internet service providers, the Internet at a specific Internet address, and at a service provider selected from among at least one of a monitoring provider and an response provider, and wherein each user profile comprises information related to at least one of contact, medical, time, billing, call tracking, and geospatial location.

13. The method according to claim 1, wherein the request for monitoring from a user sent via the user's device over the communication system further comprises one of a 911 request, an E911 request, and another public assistance request.

14. A method of security monitoring and response delivery for a user having a user's device which at least transmits and may additionally receive information, by a monitoring service whose services include monitoring the user upon request, using a communication system accessible by the user's device and the monitoring system, the method comprising the steps of:
   a. maintaining a user profile for each user in a user database that is not resident on the user's device;
   b. maintaining response provider information in a response provider database in which response providers are predetermined and include providers of at least one of assistance and emergency services which are selected from among public, private, commercial and non-commercial providers;
   c. receiving a transmission of a request for monitoring from a user sent via the user's device over the communication system; and
   d. commencing monitoring of the user via the user's device including:
      i. identifying at least one of the user and the user's device;

ii. capturing at least one of the data transmitted and the signals generated by the user's device to provide captured data and signals;
iii. accessing the user profile for the user identified;
iv. maintaining a location database of the locations of the user's device over time;
v. using advanced decision science techniques that utilize logic higher than dual binary logic to make decisions concerning best methods to employ to analyze the captured data and signals including accessing or maintaining an alert database of alerts issued by at least one of federal, state, and local entities regarding at least one of public health and safety, weather and homeland security;
vi. analyzing the captured data and signals and the alert database employing advanced analysis techniques that utilize more than dual binary logic to provide captured data and signals analysis results, by:
  (a) maintaining a signature database of pre-determined signatures of human speech, visual, and event signatures whose presence in at least one of the data transmitted and the signals generated by the user's device are subjects for analysis; and
  (b) determining whether or not the pre-determined signatures are present by:
    (1) using advanced decision science techniques that utilize more than dual state binary logic to make decisions concerning best methods to employ to analyze the captured data and signals and provide captured data and signal analysis results that determine whether or not the pre-determined signatures are present,
    (2) analyzing the captured data and signals employing advanced automated analysis techniques that utilize more than dual state binary logic to provide captured data and signal analysis results that determine whether or not the pre-determined signatures are present and perform further analysis and interpretation functions,
    (3) making decisions concerning best methods to use to monitor the user selected from among at least one of human and automated monitoring methods employing advanced decision science techniques that utilize logic higher than dual binary logic, and
    (4) storing in a records database at least one of (a) the data transmitted and signals generated by the user's device and (b) the captured data and signals analysis results;
vii. maintaining a results database of the captured data and signals analysis results; and
viii. determining an indication of urgency for a required response by applying operations research and management science analysis and decision science support tools to information including the captured data and signals analysis results, the alerts, the location data, and information from other databases, and calculating a severity rating based on occurrence and number of the pre-determined signatures included in the captured data and signals, and internal measures produced by the monitoring system in the course of the captured data and signals analysis.

15. The method according to claim 14, wherein the signature database contains pre-determined signatures unique to the user including signatures established by at least one of biometric analysis of the user, voice recognition of the user, and another signature personal to the user, and event signatures attributed to or correlated with certain physical events including firing of weapons and sirens from public health and safety emergency response vehicles.

16. The method according to claim 14, further comprising the step of:
  e. transmitting over the communication system at least one of (1) at least one of information and an alert to the user's device and (2) a request for services to at least one response provider selected based on advanced decision science techniques and the captured data and signal analysis results, with or without receiving one of a trigger, a response, and an action physically initiated by the user,
  wherein transmitting the request for services to at least one provider in step (e) comprises:
    (i.) selecting the at least one provider from the provider database based on data and signal analysis results, indication of urgency, and severity rating;
    (ii.) accessing contact information including internet address, telephone number, and facsimile number for respective ones of the at least one provider; and
    (iii.) transmitting the request for services to the at least one provider.

17. The method according to claim 16, wherein transmitting the request for services to at least one provider in step (e) further comprises:
  (iv.) granting limited access to the at least one provider to databases of the monitoring service including the user database containing the profile of the user, and the location database indicating a geospatial location of the user's device; and
  (v.) providing joint access to or copies of pertinent data transmitted and signals generated by the user's device, and access to data and signal analysis results determined by the monitoring service.

18. A method of pro bono security monitoring and response delivery for a pro bono user having a user's device which at least transmits and may additionally receive information, by a monitoring service whose services include monitoring the user upon request, using a communication system accessible by the user's device and the monitoring system, the method comprising the steps of:
  a. maintaining a user profile for each pro bono user in a pro bono user database that is not resident on the user's device;
  b. maintaining response provider information in a response provider database in which response providers are pre-determined and include providers of at least one of assistance and emergency services which are selected from among public providers and private non-commercial volunteer providers;
  c. receiving a transmission of a request for monitoring from a pro bono user sent via the user's device over the communication system or pro bono generating such a request for response by the monitoring system itself with or without receiving a request for response from the user;
  d. attempting to commence monitoring utilizing an appropriate volunteer human monitor, and commencing monitoring of the user via the user's device if an appropriate volunteer human monitor is available including:
    i. capturing at least one of data transmitted and signals generated by the user's device to provide captured data and signals,
    ii. using advanced decision science techniques that utilize logic higher than dual binary logic to make decisions concerning best methods to employ to analyze the captured data and signals, iii. analyzing the captured data and signals employing advanced analysis techniques that utilize more than dual binary logic to provide captured data and signals analysis results, and iv. storing in a records database at least one of (A) the data transmitted and signals generated by the user's device and (B) the captured data and signals analysis results;

e. transmitting over the communication system at least one of (i.) at least one of information and an alert to the user's device and (ii.) a request for response to at least one response provider selected based on advanced decision science techniques and the captured data and signal analysis results, with or without receiving one of a trigger, a response, and an action physically initiated by the pro bono user;

f. continuing monitoring of the pro bono user via the user's device and monitoring of the at least one response provider via a response provider's device over said communication system to receive from the at least one response provider at least one of an acknowledgement of the request for services, a confirmation of a dispatch of personnel to the pro bono user, and a confirmation of delivery of services to the pro bono user;

g. interactively facilitating satisfaction of the request for services including sharing information; and h. recording in the records database at least one of (i.) satisfaction status of the request for services and (ii.) data transmitted and signals generated by at least one of the user's device and the at least one provider's device.

19. A system for security monitoring and response delivery for a user having a user's device which at least transmits and may additionally receive information, by a monitoring and response service whose services include monitoring the user upon request, using a communication system accessible by the user's device and the monitoring system, the system comprising:

a. a user database that is not resident on the user's device for maintaining a user profile for each user;

b. a response provider database for maintaining response provider information in which response providers are predetermined and include providers of at least one of assistance and emergency services which are selected from among public, private, commercial and non-commercial pro bono volunteer response providers;

c. means for transmitting a request for monitoring from a user over the communication system to the monitoring and response service which is the user's device;

d. means for monitoring of the user via the user's device commenced by the monitoring and response service in response to the request for monitoring, the monitoring and response service including:

i. capturing at least one of data transmitted and signals generated by the user's device to provide captured data and signals, ii. using advanced decision science techniques that utilize logic higher than dual binary logic to make decisions concerning best methods to employ to analyze the captured data and signals, iii. analyzing the captured data and signals employing advanced analysis techniques that utilize logic higher than dual binary logic to provide captured data and signals analysis results, iv. making decisions concerning best methods to use to monitor the user selected from among at least one of human and automated monitoring methods employing advanced decision science techniques that utilize logic higher than dual binary logic, and v. storing in a records database at least one of (A) the data transmitted and signals generated by the user's device and (B) the captured data and signals analysis results;

e. means for transmitting by the monitoring and response service at least one of (i.) at least one of information and an alert to the user's device and (ii.) a request for response to at least one response provider selected based on advanced decision science techniques and the captured data and signal analysis results, with or without receiving one of a trigger, a response, and an action physically initiated by the user;

f. means for continued monitoring of the user via the user's device and monitoring of the at least one response provider via a response provider's device over the communication system to receive from the at least one response provider at least one of an acknowledgement of the request for services, a confirmation of a dispatch of personnel to the user, and a confirmation of delivery of services to the user;

g. means for interactively facilitating satisfaction of the request for services including sharing information; and h. a records database for recording at least one of (i.) satisfaction status of the request for services and (ii.) data transmitted and signals generated by at least one of the user's device and the at least one provider's device.

20. The system according to claim 19, wherein said means for transmitting transmits at least one of information and an alert to the user's device.

21. The system according to claim 19, wherein the means for monitoring and responding is a monitoring and response service which is at least one of a commercial service and a non-commercial service, which is structured as a geographically distributed network of monitoring and response service providers that includes human monitors and responders operating individually or in small groups from locations including at least one of the monitoring and response service providers' homes, vehicles, or other locations, which locations are not provided by the monitoring and response service, and being remotely supervised, and which is available over the communication system and includes the user's device, and wherein the means for monitoring and response s not structured at a central station or location or at a number of commercial locations where monitoring and response services are dispatched or occur and are locally physically supervised.

* * * * *